United States Patent
Yen et al.

(10) Patent No.: US 9,759,973 B2
(45) Date of Patent: Sep. 12, 2017

(54) DISPLAY PANEL

(71) Applicant: InnoLux Corporation, Miao-Li County (TW)

(72) Inventors: Chung-Wen Yen, Miao-Li County (TW); Yu-Tsung Liu, Miao-Li County (TW); Te-Yu Lee, Miao-Li County (TW); Chao-Hsiang Wang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/066,283

(22) Filed: Mar. 10, 2016

(65) Prior Publication Data

US 2016/0306245 A1   Oct. 20, 2016

(30) Foreign Application Priority Data

Apr. 15, 2015  (TW) .............................. 104112025 A (51) Int. Cl.
*G02F 1/1368*  (2006.01)
*G02F 1/1362*  (2006.01)
*G02F 1/1333*  (2006.01)

(52) U.S. Cl.
CPC .. *G02F 1/136286* (2013.01); *G02F 1/133345* (2013.01); *G02F 1/136209* (2013.01); *G02F 1/136227* (2013.01)

(58) Field of Classification Search
CPC .......................... G02F 1/136286; G02F 1/1368
See application file for complete search history.

(56) References Cited

U.S. PATENT DOCUMENTS

| 6,828,734 | B2 * | 12/2004 | Miyajima | ............. G02F 1/1345 315/169.2 |
| 2002/0021378 | A1 * | 2/2002 | Murade | ............. G02F 1/136227 349/43 |
| 2005/0110929 | A1 * | 5/2005 | Nakajima | ......... G02F 1/136259 349/139 |
| 2007/0159565 | A1 * | 7/2007 | Segawa | ............. G02F 1/136209 349/38 |

FOREIGN PATENT DOCUMENTS

TW          200305745        11/2003

OTHER PUBLICATIONS

Chinese language office action dated Apr. 8, 2016, issued in application No. TW 104112025.

* cited by examiner

*Primary Examiner* — Sang V Nguyen
(74) *Attorney, Agent, or Firm* — McClure, Qualey & Rodack, LLP (57) ABSTRACT

A display panel that includes a first light-shielding layer, a semiconductor layer, an insulating layer, and a gate line are successively on a substrate is provided. A contact hole passes through the insulating layer to expose the semiconductor layer. A metal layer is on the insulating layer and electrically connected to the semiconductor layer through the contact hole. The first light-shielding layer includes an overlapping region that overlaps with the metal layer and has a first width in a first direction. A minimum distance in the first direction between the edge of the metal layer adjacent to the gate line and the bottom of the contact hole is defined as a second width. The first direction is substantially perpendicular to an extending direction of the gate line, and a ratio of the first width to the second width is in a range between 0.2 and 0.8.

15 Claims, 6 Drawing Sheets

DISPLAY PANEL

CROSS REFERENCE TO RELATED APPLICATIONS

This Application claims priority of Taiwan Patent Application No. 104112025, filed on Apr. 15, 2015, the entirety of which is incorporated by reference herein.

BACKGROUND

Field of the Disclosure

The disclosure relates to a display technology.

Description of the Related Art

Display devices (e.g., liquid-crystal displays (LCDs), active matrix organic light-emitting displays (AMOLEDs)) are widely employed in electronic products, such as notebook computers, personal digital assistants (PDAs), electronic books, projectors, and mobile phones.

Display panels typically employ thin film transistors (TFTs) as a switching element in a pixel region. Additionally, a complementary metal oxide semiconductor (CMOS) circuit composed of TFTs is also employed in a peripheral circuit (i.e., driving circuit) region. Such elements are classified as amorphous silicon (a-Si) TFTs and poly-silicon (poly-Si) TFTs according to the active layer materials used. Compared with a-Si TFTs, poly-Si TFTs have the advantages of high carrier mobility and high driving-circuit integration and are often used in applications that require high-speed operation. Thus, low temperature poly-silicon (LTPS) is a novel application for a display technology.

The TFTs that serve as switching elements of the pixel region may have a top gate structure or a bottom gate structure. In cases where the display panel has TFTs with a top gate structure, light emitted from the backlight module is applied to the active layer under the gate through the bottom substrate (e.g., TFT substrate) of the display device, generating a light leakage current in the active layer. In order to address this problem, a light-shielding layer is disposed under the active layer. Such a light-shielding layer cannot effectively block the scattering light from the backlight module, however, and therefore the electronic properties of the TFTs cannot be maintained.

Accordingly, there is a need to develop a display panel that is capable of effectively blocking light applied to the active layer under the gate, thereby improving or maintaining the electronic properties of the TFTs.

SUMMARY

An exemplary embodiment of a display panel includes a substrate; a first light-shielding layer on the substrate; a semiconductor layer on the first light-shielding layer; an insulating layer on the semiconductor layer; a gate line on the insulating layer; a contact hole passing through the insulating layer to expose the semiconductor layer; and a metal layer on the insulating layer and electrically connected to the semiconductor layer through the contact hole. The first light-shielding layer includes an overlapping region that overlaps with the metal layer, the overlapping region has a first width in a first direction, and a minimum distance in the first direction between an edge of the metal layer adjacent to the gate line and the bottom of the contact hole is defined as a second width. The first direction is substantially perpendicular to an extending direction of the gate line, and a ratio of the first width to the second width is in a range between 0.2 and 0.8.

Another exemplary embodiment of a display panel includes a substrate; a first light-shielding layer on the substrate; a semiconductor layer on the first light-shielding layer; an insulating layer on the semiconductor layer; a gate line on the insulating layer and having a protruding portion that overlaps with the semiconductor layer, wherein the protruding portion extends in a first direction, which is substantially perpendicular to an extending direction of the gate line; a contact hole passing through the insulating layer to expose the semiconductor layer; and a metal layer on the insulating layer and electrically connected to the semiconductor layer through the contact hole. The first light-shielding layer includes an overlapping region that overlaps with the metal layer, the overlapping region has a first width in a second direction, and a minimum distance in the second direction between an edge of the metal layer adjacent to the protruding portion and the bottom of the contact hole is defined as a second width. The second direction is substantially parallel to the extending direction of the gate line, and a ratio of the first width to the second width is in a range between 0.2 and 0.8.

An exemplary embodiment of a display device includes a display panel including a substrate; a first light-shielding layer on the substrate; a semiconductor layer on the first light-shielding layer; an insulating layer on the semiconductor layer; a gate line on the insulating layer; a contact hole passing through the insulating layer to expose the semiconductor layer; and a metal layer on the insulating layer and electrically connected to the semiconductor layer through the contact hole. The first light-shielding layer includes an overlapping region that overlaps with the metal layer, the overlapping region has a first width in a first direction, and a minimum distance in the first direction between an edge of the metal layer adjacent to the gate line and the bottom of the contact hole is defined as a second width. The first direction is substantially perpendicular to an extending direction of the gate line, and a ratio of the first width to the second width is in a range between 0.2 and 0.8. The display device further includes a backlight module oppositely disposed to the display panel.

BRIEF DESCRIPTION OF DRAWINGS

The disclosure can be more fully understood by reading the subsequent detailed description and examples with references made to the accompanying drawings, wherein.

DETAILED DESCRIPTION

The following description encompasses the fabrication process and the purpose of the disclosure. It should be understood that this description is provided for the purpose of illustrating the fabrication process and the use of the disclosure and should not be taken in a limiting sense. In the drawings or disclosure, the same or similar elements are represented or labeled by the same or similar symbols. Moreover, the shapes or thicknesses of the elements shown in the drawings may be magnified for simplicity and convenience. Additionally, common elements which are well known in the art are not shown or described in the drawings or disclosure.

Figure 1:
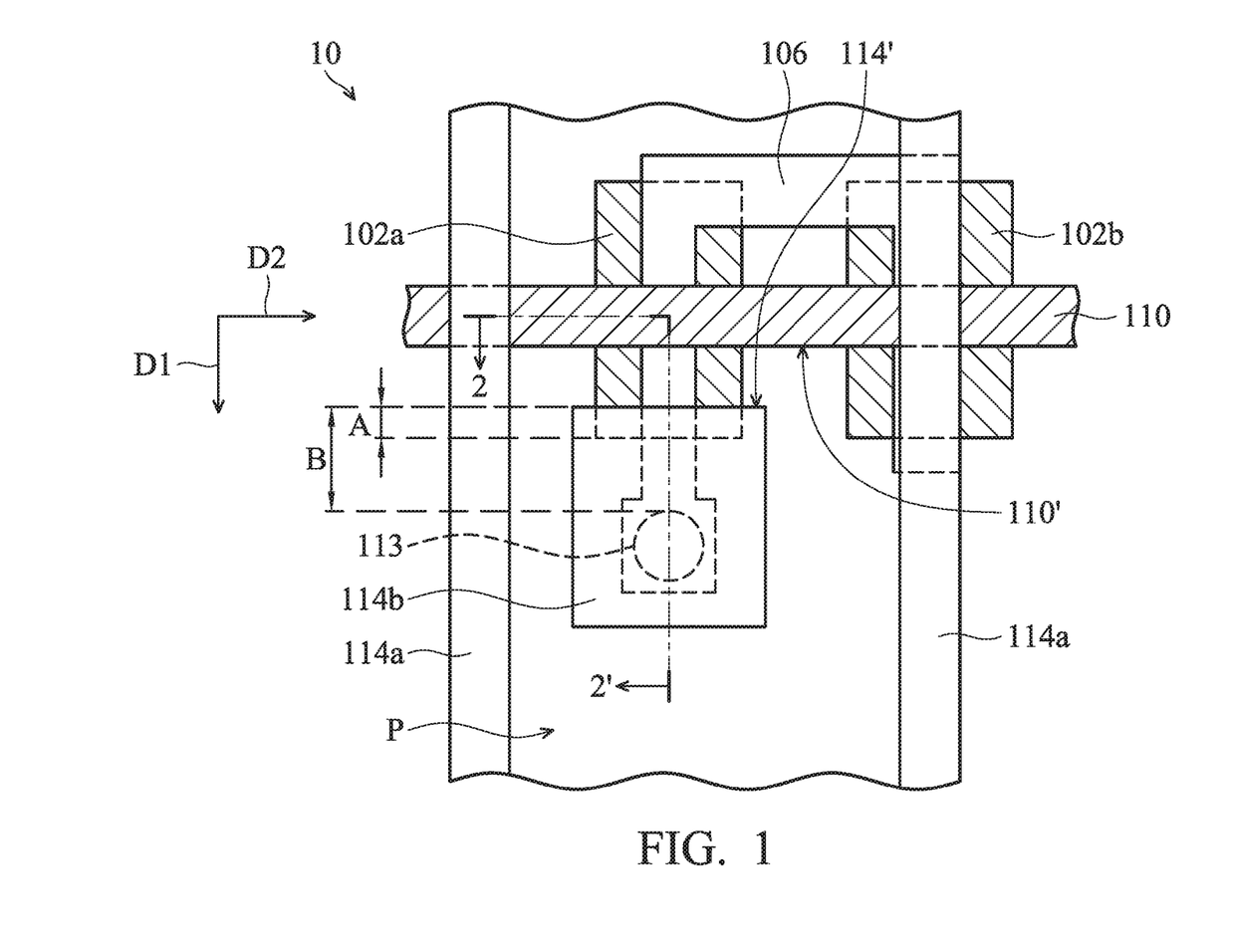
FIG. 1 is a top view of a pixel unit of a display panel according to an exemplary embodiment.
Figure 2:
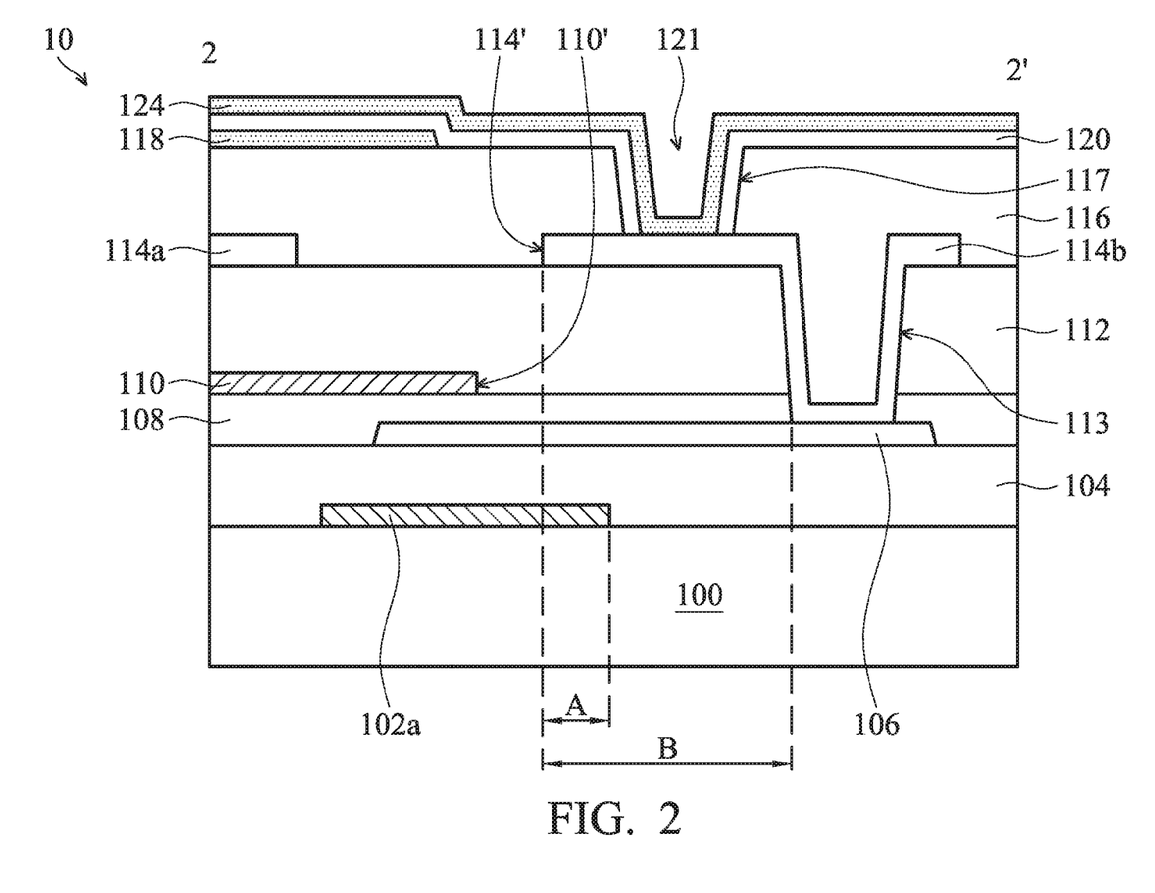
FIG. 2 is a cross section along 2-2' line shown in FIG. 1.

FIG. 1 illustrates a top view of a pixel unit 10 of a display panel according to an exemplary embodiment and FIG. 2 illustrates a cross section along 2-2' line shown in FIG. 1. In one embodiment, the pixel unit 10 may be implemented in an LCD panel. The pixel unit 10 comprises a substrate 100, a first light-shielding layer 102a and a second light-shielding layer 102b, a semiconductor layer 106, an insulating layer 108, a contact hole 113, a pair of gate lines 110, a pair of data lines 114a, and a metal layer 114b. The substrate 100 includes a pixel region P defined by the pair of gate lines 110 and the pair of data lines 114a. Herein, only the pair of data lines 114a and one gate line 110 is depicted in FIG. 1, to simplify the diagram. Moreover, the substrate 100 may be made of a transparent material, such as glass, quartz or plastic, and serve as a TFT substrate for the display panel.

The first light-shielding layer 102a and the second light-shielding layer 102b (not shown in FIG. 2) are disposed on the substrate 100, in which the first light-shielding layer 102a includes an overlapping region that overlaps with the gate line 110, and the second light-shielding layer 102b includes a portion that overlaps with a region of the intersection of the data line 114a and the gate line 110. In the embodiment, the first light-shielding layer 102a and the second light-shielding layer 102b are employed to block the light from the backlight module (not shown) of the display panel, and may be made of metal materials or other opaque non-metal materials.

In the embodiment, the pixel unit 10 further comprises a buffer layer 104 (not shown in FIG. 1) disposed on the substrate 10 and covering the first light-shielding layer 102a and the second light-shielding layer 102b. In the embodiment, the buffer layer 104 may be a single layer or a multi-layer structure, and comprise silicon oxide, silicon nitride, oxynitride or a combination thereof.

The semiconductor layer 106 is disposed on the buffer layer 104 to serve as an active layer of a TFT (i.e., a switching element of the pixel unit 10). Moreover, the semiconductor layer 106 includes a portion that overlaps with the first light-shielding layer 102a, and another portion that overlaps with the second light-shielding layer 102b. In one embodiment, the semiconductor layer 106 may include an LTPS.

The insulating layer 108 is disposed on the buffer layer 104 and covers the semiconductor layer 106 to serve as a gate dielectric layer of the TFT. In the embodiment, the insulating layer 108 may be a single layer or a multi-layer structure, and comprise silicon oxide, silicon nitride, oxynitride, hafnium oxynitride (HfON) or a combination thereof.

The gate line 110 is disposed on the insulating layer 108 to serve as a gate electrode of the TFT. Moreover, the gate line 110 includes a portion that overlaps with the semiconductor layer 106 and the first light-shielding layer 102a, and another portion that overlaps with the semiconductor layer 106 and the second light-shielding layer 102b. In one embodiment, the gate line 110 may be made of metal materials (such as molybdenum, aluminum, copper, titanium or a combination thereof) or other suitable electrode materials.

In the embodiment, the pixel unit 10 further comprises an interlayer dielectric (ILD) layer 112 (not shown in FIG. 1) disposed on the insulating layer 108 and covering the gate line 110. In the embodiment, the contact hole 113 passes through the ILD layer 112 and the insulating layer 108 to expose the semiconductor layer 106. Moreover, in the embodiment, the ILD layer 112 may be a single layer or a multi-layer structure, and comprise silicon oxide, silicon nitride, oxynitride or a combination thereof.

Each data line 114a is disposed on the ILD layer 112 and above the gate line 110, such that each data line 114a includes a region that intersects each gate line 110. Moreover, the second light-shielding layer 102b includes a portion that overlaps with the intersection of one of the pair of data lines 114a and the gate line 110, as shown in FIG. 1.

The metal layer 114b is disposed on the ILD layer 112 and above the insulating layer 108, and conformably extends along the sidewalls and bottom of the contact hole 113, such that the metal layer 114b passes through the contact hole 113 and is electrically connected to the semiconductor layer 106 exposed from the contact hole 113. In one embodiment, the metal layer 114b and the data lines 114a are formed by the same material layer comprising, for example, molybdenum, aluminum, copper, titanium or a combination thereof.

In the embodiment, as shown in FIGS. 1 and 2, the first light-shielding layer 102a includes an overlapping region that overlaps with the metal layer 114b. The overlapping region is useful for the first light-shielding layer 102a to block the scattering light applied to the semiconductor layer 106 from the backlight module (not shown), thereby mitigating or reducing the light leakage current generated in the semiconductor layer 106 due to the scattering light applied thereon. However, when the overlapping region is too small, the metal layer 114b cannot help the first light-shielding layer 102a effectively block the scattering light applied to the semiconductor layer 106 from the backlight module. Conversely, when the overlapping region is too large, excessive parasitic capacitance may result.

Accordingly, in the embodiment, as shown in FIG. 1, the metal layer 114b has an edge 114' that is adjacent to an edge 110' of the gate line 110. Moreover, the overlapping region has a first width A in a first direction D1 (which is substantially perpendicular to an extending direction of the gate line 110, and the extending direction is substantially parallel to a second direction D2), and a minimum distance in the first direction D1 between the edge 114' of the metal layer 114b and the bottom of the contact hole 113 is defined as a second width B. A ratio of the first width A to the second width B is in a range between 0.2 and 0.8.

In the embodiment, the pixel unit 10 further comprises a planarization layer 116 and a contact hole 117 (not shown in FIG. 1). The planarization layer 116 is disposed on the ILD layer 112, covers the data lines 114a and the metal layer 114b, and is filled into the contact hole 113. Moreover, the contact hole 117 passes through the planarization layer 116 to expose the metal layer 114b. In one embodiment, the planarization layer 116 may comprise an insulating material, such as perfluoroalkoxy (PFA) polymer resin.

In the embodiment, the pixel unit 10 further comprises a lower transparent electrode 118, an upper transparent electrode 124, and a passivation layer 120 (not shown in FIG. 1) between the two transparent electrodes 118 and 124. In the embodiment, the lower transparent electrode 118 is disposed on the planarization layer 116 to serve as a common electrode of the pixel unit 10. Moreover, the passivation layer 120 is disposed on the planarization layer 116 and covers the lower transparent electrode 118 and the sidewalls of the contact hole 117 to form a contact hole 121 that exposes the metal layer 114b and is in the contact hole 117. The upper transparent electrode 124 is disposed on the passivation layer 120, electrically connected to the metal layer 114b exposed from the bottom of the contact hole 121 by the contact hole 121, and electrically isolated from the lower transparent electrode 118 by the passivation layer 120. The upper transparent electrode 124 serves as the pixel electrode of the pixel unit 10. In the embodiment, the lower transparent electrode 118 and the upper transparent electrode 124 may be made of transparent conductive materials (e.g., indium tin oxide (ITO) or indium zinc oxide (IZO)). Moreover, the passivation layer 120 may be made of silicon nitride.

In another embodiment, the lower transparent electrode 118 is disposed on the planarization layer 116 to be electrically connected to the metal layer 114b exposed from the bottom of the contact hole 117 by the contact hole 117, thereby serving as the pixel electrode of the pixel unit 10. Moreover, the passivation layer 120 covers the lower transparent electrode 118. The upper transparent electrode 124 is disposed on the passivation layer 120 to serve as the common electrode of the pixel unit 10 and be electrically isolated from the lower transparent electrode 118 by the passivation layer 120.

Figure 3A:
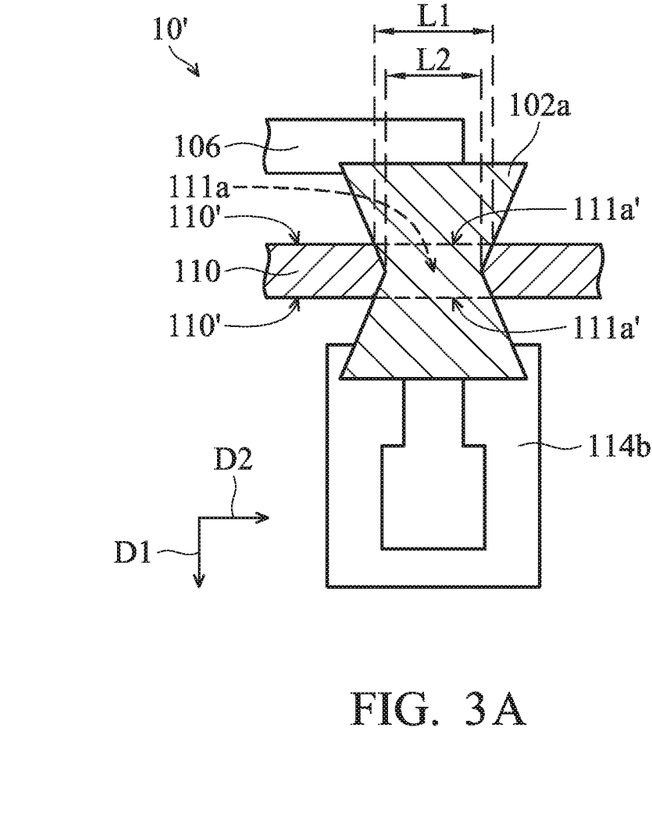
FIG. 3A is a bottom view of a pixel unit of a display panel according to an exemplary embodiment.

Referring to FIG. 3A, which illustrates a bottom view of a pixel unit of a display panel according to an exemplary embodiment, in which elements in FIG. 3A that are the same as those in FIG. 1 are labeled with the same reference numbers as in FIG. 1 and are not described again for brevity. In the embodiment, the structure of the pixel unit 10' is similar to that of the pixel unit 10 shown in FIG. 1. The difference is merely that the first light-shielding layer 102a of the pixel unit 10' has two recessed edges disposed opposite to each other, thereby reducing the area of the first light-shielding layer 102a. For example, the first light-shielding layer 102a has an overlapping region that overlaps with the gate line 110. The overlapping region includes two overlapping line segments 111a' (indicated by dotted lines) that overlap with the opposing edges 110' of the gate line 110, and a first central region 111a between the two overlapping line segments 111a'. One of the two overlapping line segments 111a' of the first light-shielding layer 102a has a first length L1 in the second direction D2, and the first central region 111a has a second length L2 in the second direction D2, in which the first length L1 is greater than the second length L2. As a result, the parasitic capacitance between the first light-shielding layer 102a and the gate line 110 can be effectively reduced. In another embodiment, the second light-shielding layer 102b (not shown) may have a contour that is the same as or similar to that of the first light-shielding layer 102a.

Figure 3B:
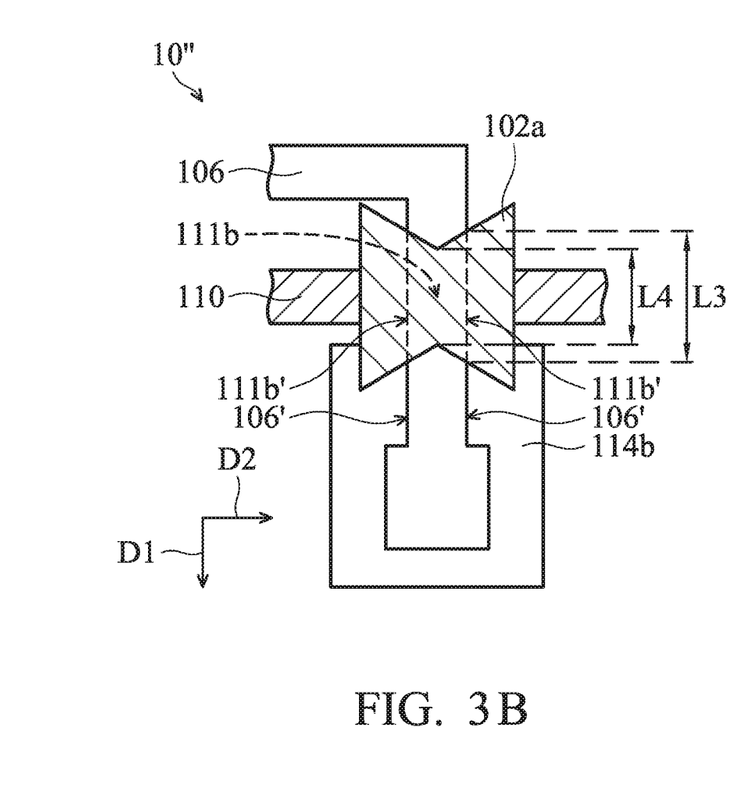
FIG. 3B is a bottom view of a pixel unit of a display panel according to an exemplary embodiment.

Referring to FIG. 3B, which illustrates a bottom view of a pixel unit of a display panel according to an exemplary embodiment, in which elements in FIG. 3B that are the same as those in FIG. 1 are labeled with the same reference numbers as in FIG. 1 and are not described again for brevity. In the embodiment, the structure of the pixel unit 10" is similar to that of the pixel unit 10 shown in FIG. 1. The difference is merely that the first light-shielding layer 102a of the pixel unit 10" has two recessed edges disposed opposite to each other, thereby reducing the area of the first light-shielding layer 102a. For example, the first light-shielding layer 102a has an overlapping region that overlaps with the semiconductor layer 106. The overlapping region includes two overlapping line segments 111b' (indicated by dotted lines) that overlap with the opposing edges 106' of the semiconductor layer 106, and a second central region 111b between the two overlapping line segments 111b'. One of the two overlapping line segments 111b' of the first light-shielding layer 102a has a third length L3 in the first direction D1, and the second central region 111b has a fourth length L4 in the first direction D1, in which the third length L3 is greater than the fourth length L4. As a result, the parasitic capacitance between the first light-shielding layer 102a and the semiconductor layer 106 can be effectively reduced. In another embodiment, the second light-shielding layer 102b (not shown) may have a contour that is the same as or similar to that of the first light-shielding layer 102a.

It should be appreciated that, in the pixel unit 10 of FIG. 1, the first light-shielding layer 102a and/or the second light-shielding layer 102b may include the overlapping line segments 111a' and a first central region 111a (as shown in FIG. 3A), and include the overlapping line segments 111b' and a second central region 111b (as shown in FIG. 3B), in which the first length L1 is greater than the second length L2, and the third length L3 is greater than the fourth length L4.

Figure 4:
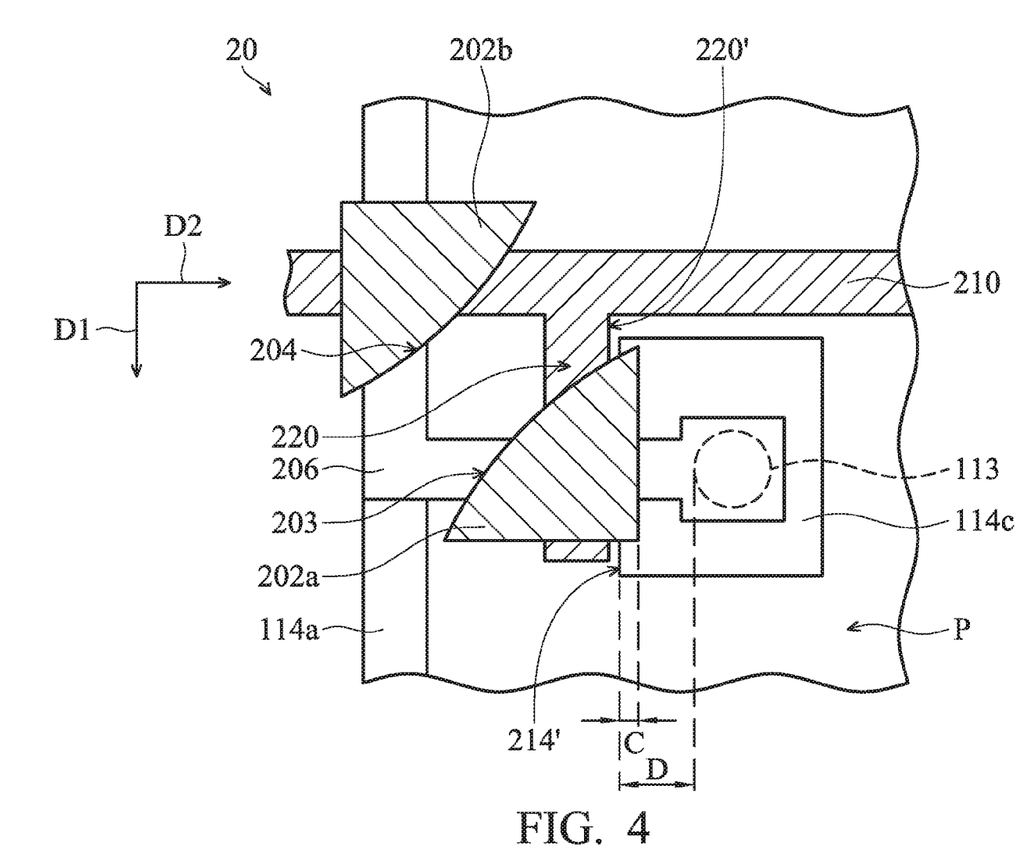
FIG. 4 is a bottom view of a pixel unit of a display panel according to an exemplary embodiment.

Referring to FIG. 4, which illustrates a bottom view of a pixel unit of a display panel according to an exemplary embodiment, in which elements in FIG. 4 that are the same as those in FIG. 1 are labeled with the same reference numbers as in FIG. 1 and are not described again for brevity. In the embodiment, the structure of the pixel unit 20 is similar to that of the pixel unit 10 shown in FIG. 1. The pixel unit 20 comprises a substrate, a first light-shielding layer 202a and a second light-shielding layer 202b, a semiconductor layer 206, an insulating layer 108, a contact hole 113, a pair of gate lines 210, a pair of data lines 114a, and a metal layer 114c. The substrate (not shown) includes a pixel region P defined by the pair of gate lines 210 and the pair of data lines 114a. Herein, only the pair of data lines 114a and one gate line 210 are depicted in FIG. 4, to simplify the diagram.

In the embodiment, unlike the gate line 110 in FIG. 1, the gate line 210 includes a protruding portion 220 (which is also referred to as a "gate electrode"). The protruding portion 220 extends along the first direction D1 (i.e., perpendicular to an extending direction of the gate line 210).

Moreover, as shown in FIG. 4, the first light-shielding layer 202a includes a portion that overlaps the protruding portion 220, and includes an overlapping region that overlaps with the metal layer 114c. Similarly, the overlapping region is useful for the first light-shielding layer 202a to block the scattering light applied to the semiconductor layer 206 from the backlight module (not shown), thereby mitigating or reducing the light leakage current generated in the semiconductor layer 206 due to the scattering light applied thereon. In the embodiment, the metal layer 114c includes an edge 214' that is adjacent to the edge 220' of the protruding portion 220. Moreover, the overlapping region has a first width C in the second direction D2 (i.e., parallel to the extending direction of the gate line 210), and a minimum distance in the second direction D2 between the edge 214' of the metal layer 114c and the bottom of the contact hole 113 is defined as a second width D. A ratio of the first width C to the second width D is in a range between 0.2 and 0.8.

In the embodiment, the second light-shielding layer 202b includes a portion that overlaps with a region of the data line 114a and the gate line 210. Unlike the first and second light-shielding layers 102a and 102b in FIG. 1, the first light-shielding layer 202a includes a first arc-edge 203 that overlaps with the semiconductor layer 206, and the second light-shielding layer 202b includes a second arc-edge 204 that overlaps with the semiconductor layer 206. The first arc-edge 203 is adjacent to the second arc-edge 204. Since the first and second light-shielding layers 202a and 202b include the first arc-edge 203 and the second arc-edge 204, respectively, the distance between the first and second light-shielding layers 202a and 202b can be reduced, thereby increasing the aperture ratio of the pixel unit 20.

It should be appreciated that the structure of the pixel units 20 may further comprise a buffer layer 104, an insulating layer 108, an ILD layer 112, a planarization layer 116, contact holes 117 and 121, a lower transparent electrode 118, a passivation layer 120 and an upper transparent electrode 124 that are similar to those in pixel unit 10, shown in FIG. 2, and for brevity these are not described again herein.

Figure 5:
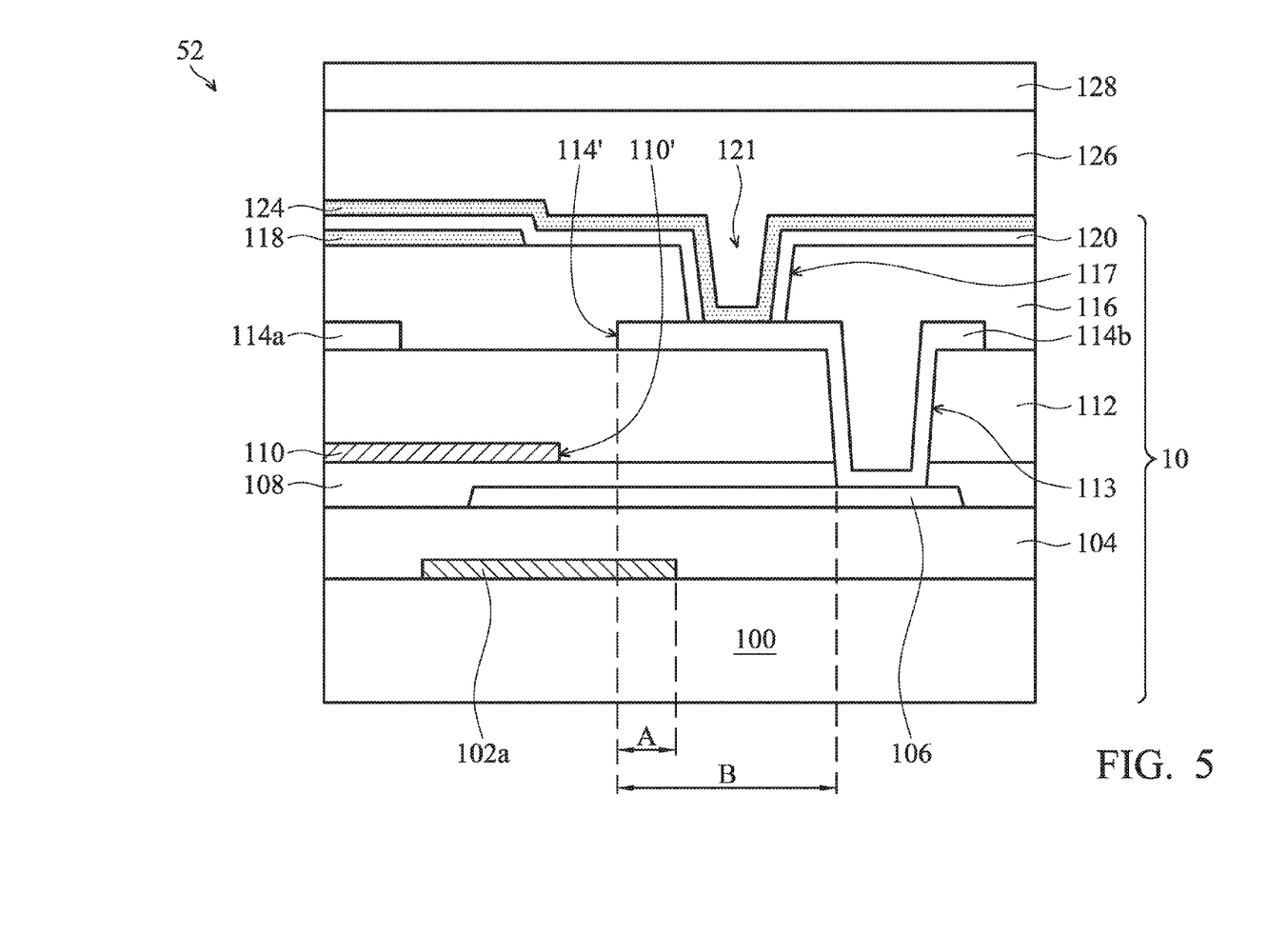
FIG. 5 is a cross section of a display panel according to an exemplary embodiment.

Referring to FIG. 5, which illustrates a cross section of a display panel according to an exemplary embodiment, in which elements in FIG. 5 that are the same as those in FIG. 1 or 2 are labeled with the same reference numbers as in FIG. 1 or 2 and are not described again for brevity. In the embodiment, the display panel 52 further includes a liquid crystal layer 126 which is disposed on a pixel unit which has a structure same as that of the pixel unit 10 (as shown in FIG. 2). Moreover, a second substrate 128 is opposite to the substrate 100, such that the liquid crystal layer 126 is interposed between the substrate 100 and the second substrate 128. The substrate 128 may be made of a transparent material, such as glass, quartz or plastic, and serve as a color filter (CF) substrate for the display panel. In some embodiment, the liquid crystal layer 126 and the overlying substrate 128 may be disposed on a pixel unit which has a structure same as that of one of the pixel unit 10', 10" and 20 (as shown in FIGS. 3A, 3B and 4, respectively).

Figure 6:
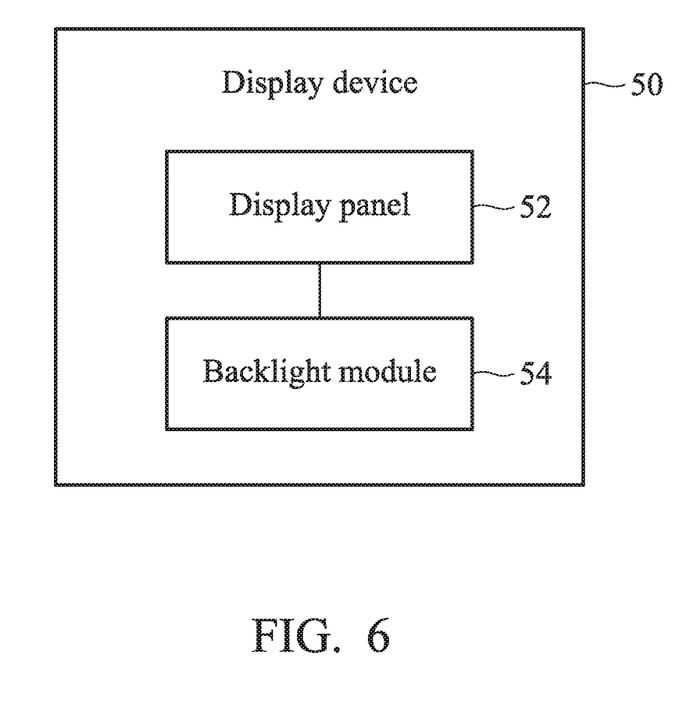
FIG. 6 is a block diagram of a display device according to an exemplary embodiment.

Referring to FIG. 6, which illustrates a block diagram of a display device according to an exemplary embodiment. In the embodiment, the display device 50 may include the display panel 52 mentioned above and a backlight module 54. In the embodiment, the backlight module 54 is oppositely disposed to the display panel 52. For example, the backlight module 54 is disposed under the substrate 100 of the display panel 52.

According to the foregoing embodiments, since there is a suitable overlapping region between the metal layer and the first light-shielding layer in the pixel unit for the display panel, the scattering light applied on the semiconductor layer from the backlight module can be effectively blocked without incurring excessive parasitic capacitance, thereby mitigating or reducing light leakage current. Moreover, since the first light-shielding layer and/or the second light-shielding layer include(s) at least two recess edges opposite to each other, the parasitic capacitance between the light-shielding layer and the gate line and/or between the light-shielding layer and the semiconductor layer can be reduced further. Additionally, in cases where the gate line has a protruding portion, since the first and second light-shielding layers include arc-edges close to and opposite from each other, the distance between the first and second light-shielding layers can be reduced, thereby increasing the aperture ratio of the pixel unit.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display panel, comprising:
a substrate;
a first light-shielding layer on the substrate;
a semiconductor layer on the first light-shielding layer;
an insulating layer on the semiconductor layer;
a gate line on the insulating layer;
a contact hole passing through the insulating layer to expose the semiconductor layer; and
a metal layer on the insulating layer and electrically connected to the semiconductor layer through the contact hole;
wherein the first light-shielding layer comprises an overlapping region that overlaps with the metal layer, the overlapping region has a first width in a first direction, and a minimum distance in the first direction between an edge of the metal layer adjacent to the gate line and the bottom of the contact hole is defined as a second width; and
wherein the first direction is substantially perpendicular to an extending direction of the gate line, and a ratio of the first width to the second width is in a range between 0.2 and 0.8.

2. The display panel of claim 1,
wherein the first light-shielding layer includes a second overlapping region that overlaps with the gate line, the second overlapping region includes two overlapping line segments that overlap with opposing edges of the gate line and a first central region between the overlapping line segments, one of the overlapping line segments of the first light-shielding layer has a first length in a second direction, and the first central region has a second length in the second direction; and
wherein the second direction is substantially parallel to the extending direction of the gate line and the first length is greater than the second length.

3. The display panel of claim 1,
wherein the first light-shielding layer includes a third overlapping region that overlaps with the semiconductor layer, the third overlapping region includes two overlapping line segments that overlap with opposing edges of the semiconductor layer and a second central region between the overlapping line segments, one of the overlapping line segments of the first light-shielding layer has a third length in the first direction, and the second central region has a fourth length in the first direction; and
wherein the third length is greater than the fourth length.

4. The display panel of claim 1, further comprising a second light-shielding layer between the substrate and the semiconductor layer, and having a portion that overlaps with a region of the intersection of the semiconductor layer and the gate line.

5. The display panel of claim 1, further comprising a buffer layer between the first light-shielding layer and the semiconductor layer.

6. The display panel of claim 1, further comprising:
a second substrate opposite to the substrate; and
a liquid crystal layer interposed between the substrate and the second substrate, wherein the liquid crystal layer is disposed over the metal layer.

7. A display panel, comprising:
a substrate;
a first light-shielding layer on the substrate;
a semiconductor layer on the first light-shielding layer;
an insulating layer on the semiconductor layer;
a gate line on the insulating layer and having a protruding portion that overlaps with the semiconductor layer, wherein the protruding portion extends in a first direction, which is substantially perpendicular to an extending direction of the gate line;

a contact hole passing through the insulating layer to expose the semiconductor layer; and a metal layer on the insulating layer and electrically connected to the semiconductor layer through the contact hole;

wherein the first light-shielding layer comprises an overlapping region that overlaps with the metal layer, the overlapping region has a first width in a second direction, and a minimum distance in the second direction between an edge of the metal layer adjacent to the protruding portion and the bottom of the contact hole is defined as a second width; and wherein the second direction is substantially parallel to the extending direction of the gate line, and a ratio of the first width to the second width is in a range between 0.2 and 0.8.

8. The display panel of claim 7, further comprising a second light-shielding layer between the substrate and the semiconductor layer, wherein the first light-shielding layer includes a first arc-edge that overlaps with the semiconductor layer, the second light-shielding layer includes a second arc-edge that overlaps with the semiconductor layer, and the first arc-edge is close to the second arc-edge.

9. The display panel of claim 8, wherein the first light-shielding layer includes a portion that overlaps with a region of the intersection of the semiconductor layer and the gate line.

10. The display panel of claim 9, wherein the first light-shielding layer includes a portion that overlaps with the protruding portion, and the second light-shielding layer includes a portion that overlaps with another region of the intersection of the semiconductor layer and the gate line.

11. The display panel of claim 7, further comprising a buffer layer between the first light-shielding layer and the semiconductor layer.

12. The display panel of claim 7, further comprising:
a second substrate opposite to the substrate; and
a liquid crystal layer interposed between the substrate and the second substrate, wherein the liquid crystal layer is disposed over the metal layer.

13. A display device, comprising:
a display panel, comprising:
a substrate;
a first light-shielding layer on the substrate;
a semiconductor layer on the first light-shielding layer;
an insulating layer on the semiconductor layer;
a gate line on the insulating layer;
a contact hole passing through the insulating layer to expose the semiconductor layer; and
a metal layer on the insulating layer and electrically connected to the semiconductor layer through the contact hole;
wherein the first light-shielding layer comprises an overlapping region that overlaps with the metal layer, the overlapping region has a first width in a first direction, and a minimum distance in the first direction between an edge of the metal layer adjacent to the gate line and the bottom of the contact hole is defined as a second width; and
wherein the first direction is substantially perpendicular to an extending direction of the gate line, and a ratio of the first width to the second width is in a range between 0.2 and 0.8; and
a backlight module oppositely disposed to the display panel.

14. The display device of claim 13,
wherein the first light-shielding layer includes a second overlapping region that overlaps with the gate line, the second overlapping region includes two overlapping line segments that overlap with opposing edges of the gate line and a first central region between the overlapping line segments, one of the overlapping line segments of the first light-shielding layer has a first length in a second direction, and the first central region has a second length in the second direction; and
wherein the second direction is substantially parallel to the extending direction of the gate line and the first length is greater than the second length.

15. The display device of claim 13,
wherein the first light-shielding layer includes a third overlapping region that overlaps with the semiconductor layer, the third overlapping region includes two overlapping line segments that overlap with opposing edges of the semiconductor layer and a second central region between the overlapping line segments, one of the overlapping line segments of the first light-shielding layer has a third length in the first direction, and the second central region has a fourth length in the first direction; and
wherein the third length is greater than the fourth length.

* * * * *